United States Patent
Patenaude et al.

(10) Patent No.: US 7,599,680 B2
(45) Date of Patent: Oct. 6, 2009

(54) SYSTEM AND METHOD OF BILLING FOR MINUTES SHARED BETWEEN A PORTABLE WIRELESS COMMUNICATION DEVICE AND A TELEMATICS UNIT

(75) Inventors: Russell A. Patenaude, Macomb Township, MI (US); Anthony J. Sumcad, Southfield, MI (US); Hitan S. Kamdar, Utica, MI (US)

(73) Assignee: General Motors Company, Detroit, MI (US)

( * ) Notice: Subject to any disclaimer, the term of this patent is extended or adjusted under 35 U.S.C. 154(b) by 440 days.

(21) Appl. No.: 10/973,562

(22) Filed: Oct. 26, 2004

(65) Prior Publication Data

US 2006/0089100 A1  Apr. 27, 2006

(51) Int. Cl.
*H04M 11/00* (2006.01)

(52) U.S. Cl. .................. 455/406; 455/41.2; 455/41.3; 455/456.1; 455/206; 455/433; 455/405; 370/350; 706/26; 702/188; 701/29; 701/27; 701/34; 701/36; 701/45; 701/60

(58) Field of Classification Search ............... 455/41.2, 455/41.3, 456.1, 406, 433, 405, 550; 370/350; 706/26
See application file for complete search history.

(56) References Cited

U.S. PATENT DOCUMENTS

| 6,751,475 | B1 * | 6/2004 | Holmes et al. | 455/557 |
|---|---|---|---|---|
| 6,993,319 | B2 * | 1/2006 | Himmel et al. | 455/406 |
| 2002/0107031 | A1 * | 8/2002 | Syrjarinne et al. | 455/456 |
| 2002/0193092 | A1 * | 12/2002 | Bhogal et al. | 455/405 |
| 2003/0139179 | A1 * | 7/2003 | Fuchs et al. | 455/426 |
| 2003/0232615 | A1 * | 12/2003 | Kim et al. | 455/405 |
| 2004/0203582 | A1 * | 10/2004 | Dorenbosch et al. | 455/406 |

* cited by examiner

*Primary Examiner*—Rafael Pérez-Gutiérrez
*Assistant Examiner*—Nimesh Patel
(74) *Attorney, Agent, or Firm*—Dierker & Associates, P.C.

(57) ABSTRACT

A method of tracking short-range wireless communication in a vehicle. The method includes tracking a total usage time of a short-range wireless connection between a telematics unit and a portable wireless communication device, sending the tracked total usage time from the telematics unit to a call center via a wireless connection and generating a usage bill at the call center based on the total usage time.

17 Claims, 4 Drawing Sheets

SYSTEM AND METHOD OF BILLING FOR MINUTES SHARED BETWEEN A PORTABLE WIRELESS COMMUNICATION DEVICE AND A TELEMATICS UNIT

FIELD OF THE INVENTION

This invention relates generally to tracking and billing for time that a wireless communication device is communicating with a telematics unit. In particular, the invention relates to tracking time that a short-range wireless semiconductor device is in short-range wireless connection with a telematics unit and billing for that connection time.

BACKGROUND OF THE INVENTION

The opportunity to personalize features in a mobile vehicle is ever increasing as the automobile is being transformed into a communications and entertainment platform as well as a transportation platform. Many new cars will be installed with some type of telematics unit to provide wireless communication and location-based services. These services may be accessed through interfaces such as voice-recognition computer applications, touch-screen computer displays, computer keyboards, or a series of buttons on the dashboard or console of a vehicle.

Currently, telematics service call centers, in-vehicle compact disk (CD) or digital video display (DVD) media, web portals, and voice-enabled phone portals provide various types of location services, including driving directions, stolen vehicle tracking, traffic information, weather reports, restaurant guides, ski reports, road condition information, accident updates, street routing, landmark guides, and business finders.

For example, traffic and driving directions may be accessed through a voice portal that uses incoming number identification to generate location information based on the area code or prefix of the phone number, or to access location information stored in a user's profile associated with the phone number. Users may be prompted to enter more details through a voice interface. Other examples are web and wireless portals that offer location-based services such as maps and driving directions where the user enters both start and end addresses. Some of these services may have a voice interface.

Some users want to interface their personal portable wireless communication devices, such as cellular phones or PDAs with the telematics unit in order to access some of the telematics system features. With such an interface, the user can place their cell phone on the passenger seat and use the speaker system in the vehicle to talk on the cell phone. This interface also allows the user to access other the telematics features including dialing numbers one digit at a time, using a phonebook or contact list, accessing calendar appointments, storing data such as contact information, bookmarking radio stations and more.

Currently, a user can pay the up-front costs required to install the software and hardware for a permanent system to support a short-range wireless connection between the portable wireless communication device and telematics unit. The user pays up-front, since there is no currently established method to monitor the time usage of the short-range wireless connection with a telematics unit. If the user infrequently utilizes the short-range wireless connection feature, the cost for each usage is expensive for the user.

It is desirable, therefore, to offer the user a short-range wireless connection as a feature available within the software and hardware of the telematics unit that overcomes these and other disadvantages.

SUMMARY OF THE INVENTION

One aspect of the present invention provides a method of tracking short-range wireless communication in a vehicle. The method includes tracking a total usage time of a short-range wireless connection between a telematics unit and a portable wireless communication device, sending the tracked total usage time from the telematics unit to a call center via a wireless connection and generating a usage bill at the call center based on the total usage time.

Another aspect of the present invention provides a system for tracking short-range wireless communication in a vehicle. The system includes means for tracking a total usage time of a short-range wireless connection between a telematics unit and a portable wireless communication device, means for sending the tracked total usage time from the telematics unit to a call center via a wireless connection, and means for generating a usage bill at the call center based on the total usage time.

A third aspect of the present invention provides computer readable medium storing a computer program including computer readable code operable for tracking a total usage time of a short-range wireless connection between a telematics unit and a portable wireless communication device, sending the tracked total usage time from the telematics unit to a call center via a wireless connection, and generating a usage bill at the call center based on the total usage time.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

Various embodiments of the present invention are illustrated by the accompanying figures, wherein.

DETAILED DESCRIPTION OF THE PRESENTLY PREFERRED EMBODIMENTS

Figure 1:
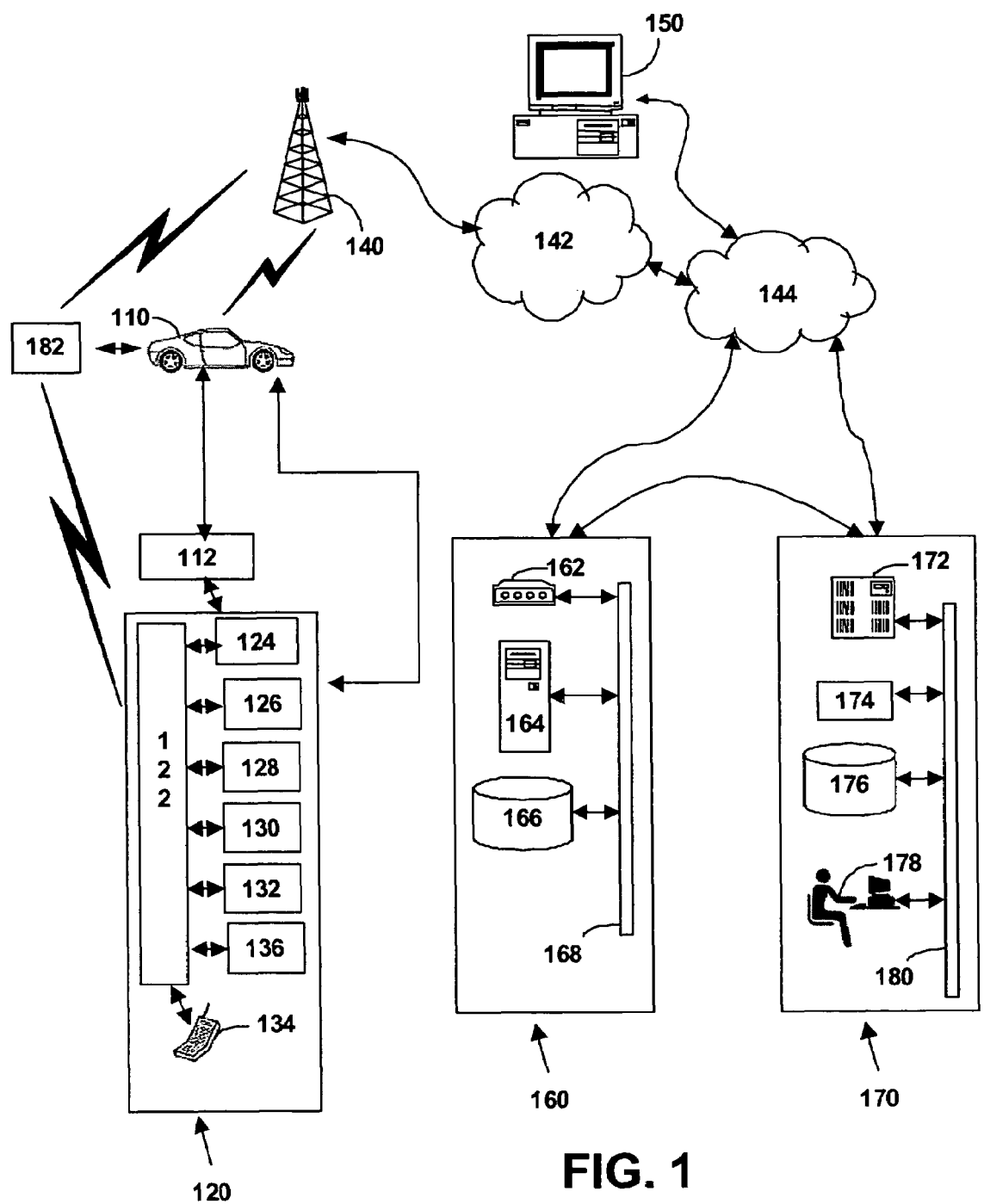
FIG. 1 is a schematic diagram of a system for providing access to a telematics system in a mobile vehicle.

FIG. 1 illustrates one embodiment of system for data transmission over a wireless communication system, in accordance with the present invention at 100. Mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more client, personal or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 may also be referred to as a mobile vehicle throughout the discussion below. In operation, MVCU 110 may be implemented as a motor vehicle, a marine vehicle, or as an aircraft. MVCU 110 includes electronic modules (not shown) attached to the vehicle communication network 112. Some electronic modules include the Powertrain Control Module (PCM), Antilock Brakes System (ABS) and Instrument Panel Cluster (IPC). MVCU 110 may include additional components not relevant to the present discussion.

Vehicle communication network 112 sends signals between various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, an embedded or in-vehicle mobile phone 134, and a short-range wireless semiconductor device 136. In other embodiments, telematics unit 120 may be implemented without one or more of the above listed components, such as, for example, an in-vehicle mobile phone 134 or speakers 132. Telematics unit 120 may include additional components not relevant to the present discussion.

Processor 122 is implemented as a microcontroller, microprocessor, controller, host processor, or vehicle communications processor. In one embodiment, processor 122 is a digital signal processor (DSP). In an example, processor 122 is implemented as an application specific integrated circuit (ASIC). In another embodiment, processor 122 is implemented as a processor working in conjunction with a central processing unit (CPU) performing the function of a general purpose processor. In one embodiment GPS unit 126 provides a position fix comprising longitude and latitude coordinates of the vehicle responsive to a GPS broadcast signal received from one or more GPS satellite broadcast systems (not shown). In-vehicle mobile phone 134 is a cellular-type phone, such as, for example an analog, digital, dual-mode, dual-band, multi-mode or multi-band cellular phone.

Processor 122 executes various computer programs that control programming and operational modes of electronic and mechanical systems within MVCU 110. Processor 122 controls communications (e.g. call signals) between telematics unit 120, wireless carrier system 140, and call center 170.

In one embodiment, a voice-recognition application is installed in processor 122 that can translate human voice input through microphone 130 to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers. In this embodiment, signals from processor 122 are translated into voice messages and sent out through speaker 132.

The short-range wireless semiconductor device 136 implements a short-range wireless technology within the telematics unit 120. The short-range wireless semiconductor device 136 provides a bridge between the telematics unit 120 and a portable wireless communication device 182, such as a PDA or a handset operating within the MVCU 110. The portable wireless communication device 182 is in communication with both the communication network 142 and the telematics unit 120 via the short-range wireless semiconductor device 136.

In one embodiment, the short-range wireless semiconductor device 136 is internal to the processor 122.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user-preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g. a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicate with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

Figure 2:
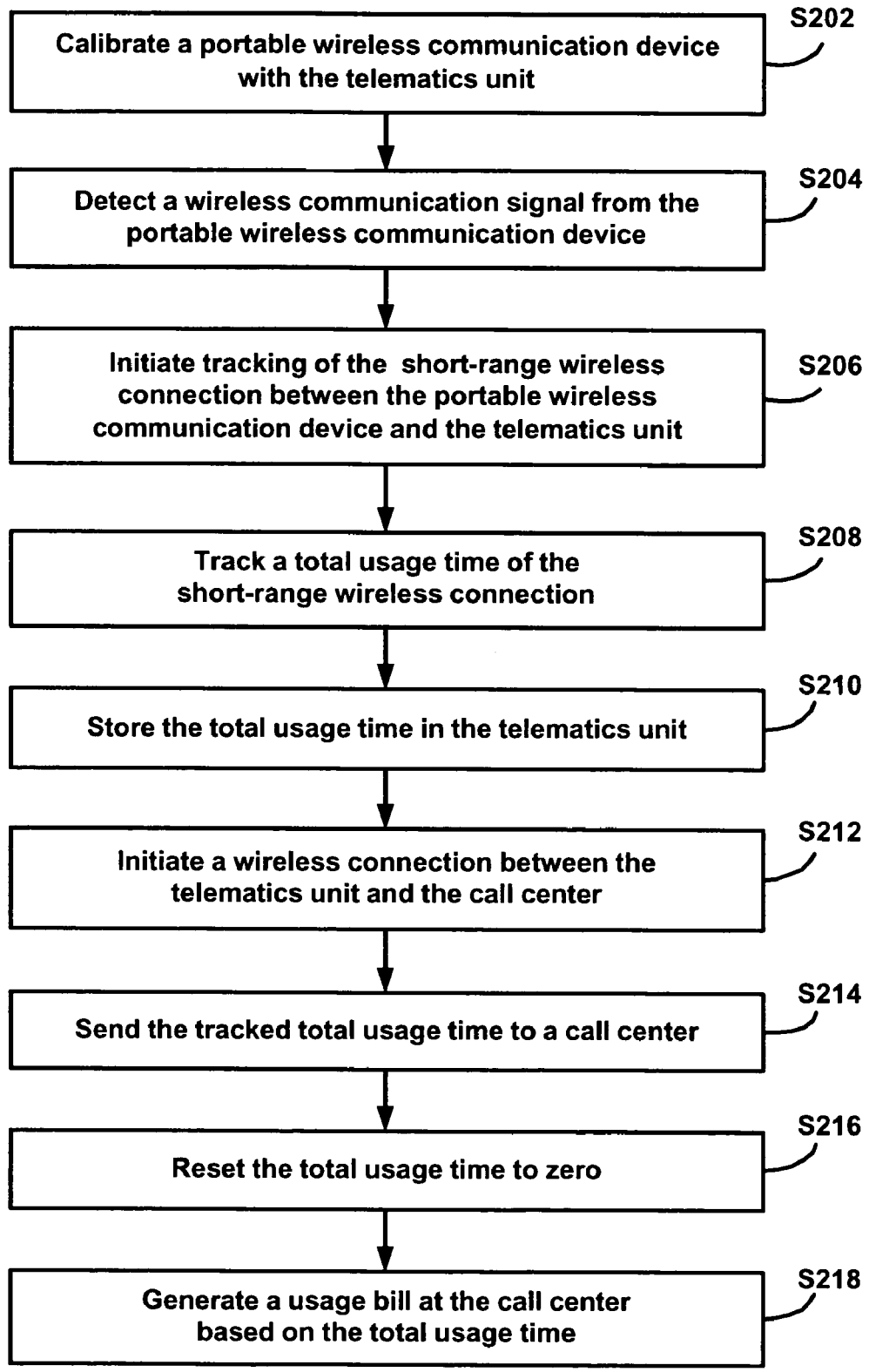
FIG. 2 illustrates a flowchart representative of a first embodiment of a method of tracking and billing for a short-range wireless communication in a vehicle in accordance with the present invention.

FIG. 2 illustrates a flowchart representative of a first embodiment of a method 200 of tracking short-range wireless communication in an MVCU 110 in accordance with the present invention. The telematics unit 120 has stored in computer readable medium at least one computer program, which includes computer readable code to perform the operations described with reference to method 200.

During stage S202, the portable wireless communication device 182 is calibrated with the short-range wireless semiconductor device 136 in the telematics unit 120. This process is required one time for each portable wireless communication device 182 that the user wants to operate in conjunction with the telematics unit 120 in the MVCU 110. The short-range wireless semiconductor devices 136 may be Bluetooth semiconductors, Wi-Fi semiconductors, or radio semiconductors. The short-range wireless semiconductor devices 136 and the portable wireless communication device 182 must include the hardware and software for compatible technologies. The portable wireless communication device 182 and the short-range wireless semiconductor device 136 each include computer readable code to calibrate with each other.

The calibration process synchronizes the short-range wireless semiconductor device 136 to recognize all wireless transmission signals from the portable wireless communication device 182.

Bluetooth is a digital radio technology developed to allow devices to communicate wirelessly over short distances of less than 10 meters. A Bluetooth semiconductor device provides spectrum spreading by frequency hopping in seventy-nine (79) hops of 1 MHz, starting at 2.402 GHz and finishing at 2.480 GHz. The Bluetooth semiconductor device uses Gaussian Frequency Shift Keying (GFSK) where a binary one is represented by a positive frequency and a binary zero is represented by a negative frequency deviation. The Bluetooth semiconductor device is designed to operate in a noisy RF environment by using a fast-acknowledgment and a 79 channel frequency-hopping scheme. The Bluetooth semiconductor device hops to a new frequency after transmitting or receiving a packet to avoid interference from other signals and to ensure reliable data transfer.

Wi-Fi semiconductor devices operate in the unlicensed 2.4 and 5 GHz radio bands at data rates of 11 Mbps or 54 Mbps, according the IEEE specifications 802.11b and 802.11a, respectively, or with both bands (dual band). Other specifications are known to those of ordinary skill in the art, and use of other specifications, including 802.11(g) and other FCC part 13 technologies is included in this disclosure. A portable communication device 182 such as a laptop computer or a personal digital assistant (PDA) can establish a Wi-Fi connection with the telematics unit 120 through a built-in, or embedded, Wi-Fi radio or through a slide-in PC card radio.

A radio semiconductor device can be a radio access semiconductor device to interface with the modules at or before a radio network controller, which performs tasks in a 3 G wireless network analogous to those of a base station controller in 2 G or 2.5 G networks. The radio network controller interfaces with service nodes and gateways to mediate with the network service providers.

As used herein, the term "calibration" means configuring a device to perform in a desired fashion. In one embodiment, calibration includes selectively enabling or disabling communication between portable wireless communication device 182 and short-range wireless semiconductor device 136. In one embodiment, calibration includes selectively setting a billing state. A billing state includes a pre-pay state, a post-pay state and an unlimited use state in one embodiment.

During stage S204, the short-range wireless semiconductor device 136 at the telematics unit 120 detects a wireless transmission signal from the portable wireless communication device 182 in response to the user opening a communication channel via one or more wireless carrier systems 140, one or more communication networks 142, and/or one or more land networks 144. The short-range wireless semiconductor device 136 establishes a short-range wireless communication with portable wireless communication device 182 in response to the detection of the wireless transmission signal. The short-range wireless semiconductor device 136 transmits a detection signal to the processor 122 in the telematics unit 120 after recognizing a transmission signal from the portable wireless communication device 182. In one embodiment, the short-range wireless connection is established within a distance of 10 meters between the portable wireless communication device 182 and the telematics unit 120.

During stage S206, the telematics unit 120 initiates tracking of a short-range wireless connection between the portable wireless communication device 182 and the telematics unit 120 responsive to short-range wireless semiconductor device 120 detecting the wireless communication signal.

The software and hardware in the telematics unit 120 is configured to automatically initiate the tracking of the short-range wireless connection between the portable wireless communication device 182 and the short-range wireless semiconductor device 136. In one embodiment, the user may select to over-ride tracking if any of the services supported by the telematics unit 120 are not required. In another embodiment, the user pushes a button on the telematics unit 120 to over-ride the tracking.

In another embodiment, the software and hardware in the telematics unit 120 is configured to automatically prevent tracking of the short-range wireless connection between the portable wireless communication device 182 and the short-range wireless semiconductor device 136, unless the user wants to use one or more of the services supported by the telematics unit 120. In this embodiment, the user selects to track the connection between the portable wireless communication device 182 and the telematics unit 120. In another embodiment, the user pushes a button on the telematics unit 120 to select to initiate the tracking.

If the tracking is not initiated, the user will not be able to access the services offered by the telematics unit 120. If a portable wireless communication device 182 is not calibrated with the telematics unit 120, the short-range wireless semiconductor device 136 does not recognize the transmission signal from the portable wireless communication device 182. In this case, the user will not be able to access the services supported by the telematics unit 120.

During stage S208, the telematics unit 120 tracks a total usage time of the short-range wireless connection between the telematics unit 120 and the portable wireless communication device 182 based on the initiation of tracking during stage S206. The telematics unit 120 tracks event usage time of the ongoing short-range wireless connection session. The event usage time is the number of minutes that the short-range wireless connection is open and using the services of the telematics system. When the short-range wireless connection session is terminated, telematics unit 120 adds the number of minutes in the event usage time to the number of minutes in the total usage time, wherein the sum forms an updated total usage time. The total usage time is the sum of all the event usage times tracked since the last time the total usage time was reset to zero, as described below with reference to stage S216. In one embodiment, the total usage time is the sum of all the event usage times tracked before a given short-range wireless connection session. The method of tracking the total usage time is described in detail below with reference to method 300 of FIG. 3.

During stage S210, the telematics unit 120 stores the total usage time in the in-vehicle memory 128 of the telematics unit 120.

During stage S212, the telematics unit 120 initiates a wireless connection between the telematics unit 120 and the call center 170. In one embodiment, the telematics unit 120 initiates a wireless connection between the telematics unit 120 and the call center 170 via the one or more wireless carrier systems 140, one or more communication networks 142, and/or one or more land networks 144 not including the short messaging service network.

In another embodiment, the telematics unit 120 initiates wireless short messaging service (SMS) connection between the telematics unit 120 and the call center 170. The wireless short messaging service networks are based on GSM, code division multiple access (CDMA), and time division multiple access (TDMA) standards. The wireless short messaging service network, which is included in the one or more wireless carrier systems 140, one or more communication networks 142, and/or one or more land networks 144, provides the mechanisms required to find the destination station, such as the call center 170, and to transport short messages between the short messaging service centers (SMSCs) and mobile switching centers to access the wireless carrier systems 140. Short messaging service has several input mechanisms to interconnect with different message sources and destinations.

A distinguishing characteristic of short messaging service is that the telematics unit 120 is able to transmit a short message at any time, independent of whether another voice or data call is in progress. Short messaging service uses out-of-band packet delivery and low-bandwidth message transfer. Short messaging service guarantees delivery of the short message. Temporary failures are identified, and the short message is stored in the short messaging service centers until the destination receiver device becomes available.

During stage S214, the telematics unit 120 sends the tracked total usage time to the call center 170 via the wireless connection established during stage S212. In one embodiment, the sending the tracked total usage time is responsive to initiating a wireless short messaging service (SMS) connection between the telematics unit 120 and the call center 170 that occurred during stage S212, and the tracked total usage time is sent to the call center 170 over the established short messaging service network. Otherwise, the tracked total usage time is sent to the call center 170 via the one or more wireless carrier systems 140, one or more communication networks 142, and/or one or more land networks 144 not including the short messaging service network.

In one embodiment, sending the tracked total usage time is responsive to triggering a vehicle data upload request from the telematics unit 120 to the call center 170. As the term is used herein, a vehicle data upload is a connection initiated by the telematics unit 120 to the call center 170, responsive to at least one trigger. A trigger is any event that has been predetermined to result in taking of predetermined actions. For example, a trigger may be traveling a certain distance, a certain number of ignition cycles, a predetermined GPS-determined location, the setting of a diagnostic trouble code (DTC), or the passage of time, such as 30 days. In this embodiment, the trigger is the passage of time since last generating a usage bill as described below with reference to stage S218, a specific date associated with generating a usage bill, or a certain number of ignition cycles. A usage bill details the charges to a user for the total usage time of a short-range wireless connection between the telematics unit 120 and the portable wireless communication device 182 to utilize the services of the telematics system.

During stage S216, the telematics unit 120 sets the total usage time stored in the in-vehicle memory 128 of the telematics unit 120 to zero responsive to the sending of the tracked total usage time in stage S214.

During stage S218, the call center 170 generates a usage bill based on the total usage time sent to the call center 170 during stage S214. The call center 170 receives the total usage time and multiplies the minutes of the total usage time by a preset billing rate to obtain the charge for the total usage time. In one embodiment, the call center 170 adds any taxes, fees or other billable charges as required by a contract or regulations associated with the usage bill. In this embodiment, the billing occurs periodically.

In another embodiment, the user is periodically billed a flat rate for the service of obtaining telematics system features with the portable wireless communication device 182, if the service was used during that period. In an alternative embodiment, the user is periodically billed a flat rate for the service, whether or not the service was used. In this latter embodiment, the tracking of total usage time is not required.

In one embodiment, the carrier for the portable wireless communication device 182, or a third party facility, handles the billing rather than the call center 170. In that case, a wireless short messaging service (SMS) connection is established between the telematics unit 120 and the carrier for the portable wireless communication device 182 for the carrier to verify the connection between the portable wireless communication device 182 and the telematics unit 120. In one embodiment, the telematics unit 120 sends the event usage time to the carrier. In another embodiment, the carrier tracks the total usage time after the telematics unit 120 establishes a wireless short messaging service (SMS) connection with the carrier and prompts the carrier to begin tracking.

Figure 3:
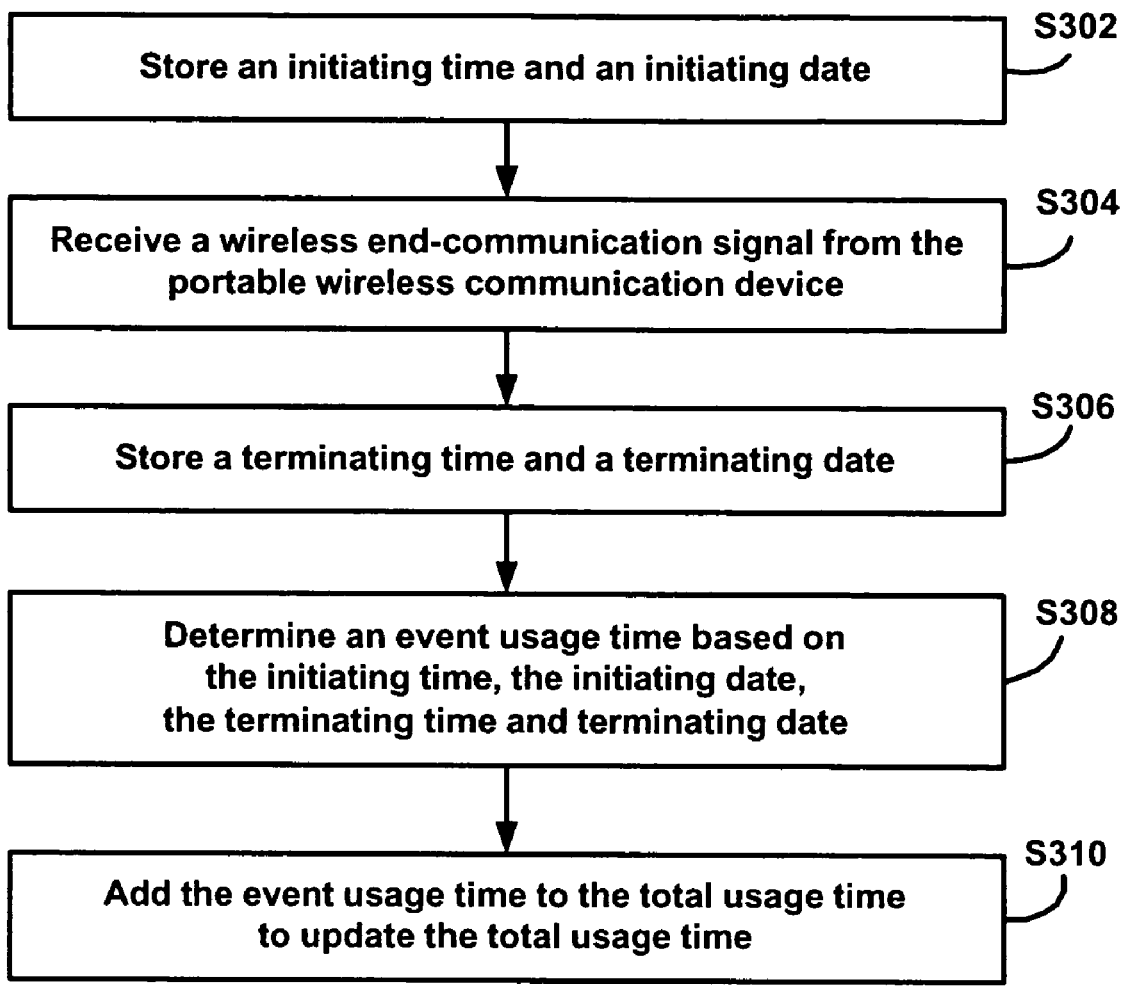
FIG. 3 illustrates a flowchart representative of a first embodiment of a method of tracking the total usage time in accordance with the present invention.

FIG. 3 illustrates a flowchart representative of a first embodiment of a method 300 of tracking the total usage time in accordance with the present invention. The telematics unit 120 has stored in computer readable medium at least one computer program, which includes computer readable code to perform the operations described with reference to method 300.

During stage S302, the telematics unit 120 stores an initiating time and an initiating date associated with initiating the tracking of the short-range wireless connection that occurred during stage S206 of method 200 in FIG. 2 in the in-vehicle memory 128. During stage S304, the telematics unit 120 receives a wireless end-communication signal from the portable wireless communication device 182. The short-range wireless connection between the portable wireless communication device 182 and telematics unit 120 is terminated when the portable wireless communication device 182 ends transmission to an external receiver over the one or more wireless carrier systems 140, one or more communication networks 142, and/or one or more land networks 144.

The communication between the portable wireless communication device 182 and the external receiver is terminated by transmission of the wireless end-communication signal from the portable wireless communication device 182, which is also received by the short-range wireless semiconductor device 136. The short-range wireless semiconductor device 136 transmits the end-communication signal to the processor 122 in the telematics unit 120. The processor 122 establishes a terminating time and a terminating date when the end-communication signal is received from the short-range wireless semiconductor device 136. Specifically, the terminating time and the terminating date are the time and date that the end-communication signal received at the telematics unit 120.

In one embodiment, the user has the option to terminate tracking of the event usage time of the short-range wireless connection after obtaining the desired telematics services, but before terminating the communication with an external receiver via one or more wireless carrier systems 140, one or more communication networks 142, and/or one or more land networks 144. In this case, the user may push a button to terminate the tracking and to deliver an end-communication signal to the telematics unit 120. In this embodiment, the end-communication signal may not be wireless and can be input directly to the telematics unit 120.

During stage S306, the telematics unit 120 stores the terminating time and the terminating date, which were established responsive to receiving the wireless end-communication signal in the in-vehicle memory 128.

During stage S308, the telematics unit 120 determines an event usage time based on the initiating time, the initiating date, the terminating time and terminating date. Specifically, the telematics unit 120 retrieves the initiating time on the initiating date and the terminating time on the terminating date stored in the in-vehicle memory 128 and calculates the number of minutes that passed between the initiating and the terminating. The calculated minutes equal the event usage time. In one embodiment, the telematics unit 120 calculates the number of minutes and seconds to form the event usage time in minutes and seconds.

During stage S310, the telematics unit 120 adds the event usage time to the total usage time in order to update the total usage time responsive to determining the event usage time.

Figure 4:
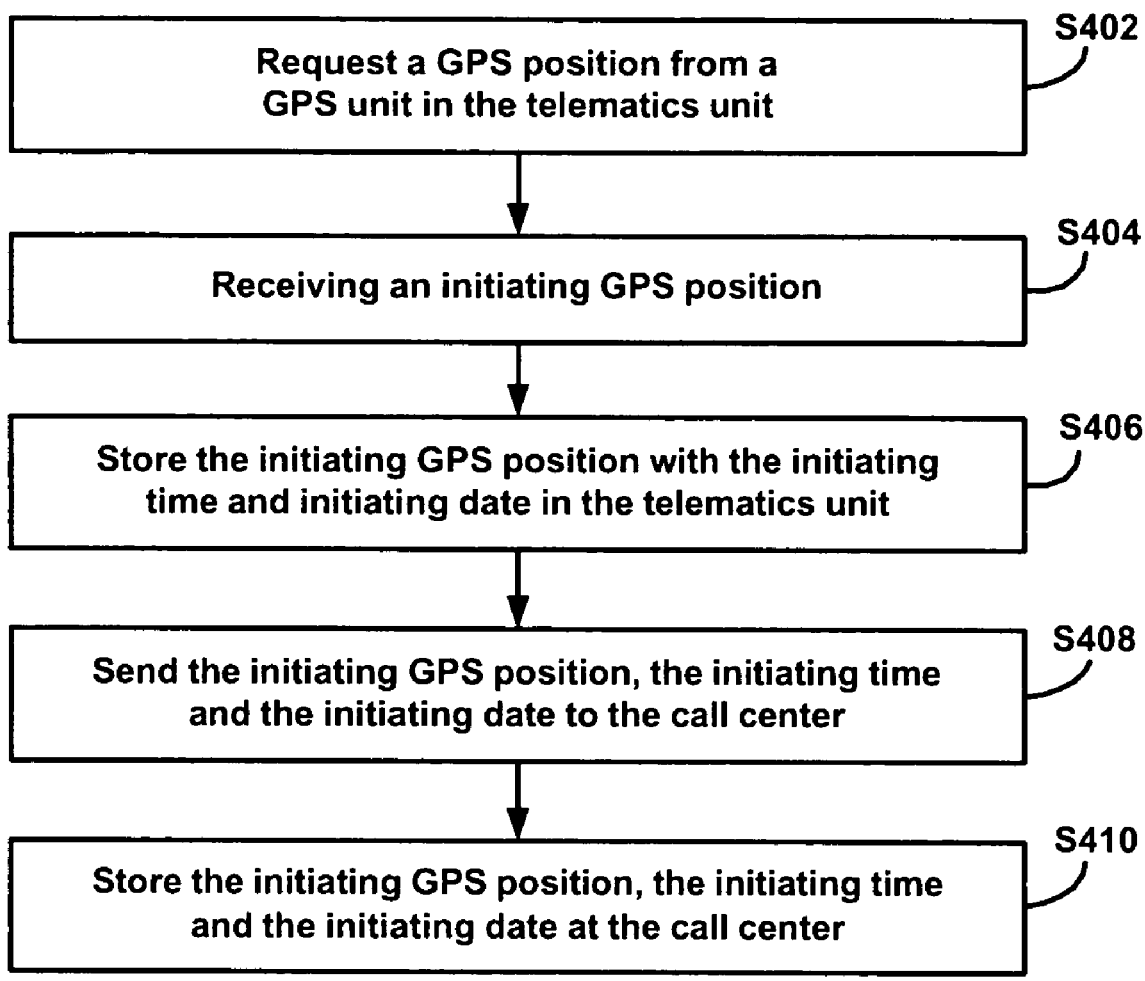
FIG. 4 illustrates a flowchart representative of a first embodiment of a method of monitoring call initiation location according to the present invention.

FIG. 4 illustrates a flowchart representative of a first embodiment of a method 400 of monitoring call initiation location according to the present invention. The initiation location includes the longitude and latitude of the MVCU 110 when the short-range wireless connection is initiated. The telematics unit 120 has stored in computer readable medium at least one computer program, which includes computer readable code to perform the operations described with reference to method 300.

During stage S402, the processor 122 requests a position fix from a GPS unit 126 in the telematics unit 120 responsive to initiating the tracking of the short-range wireless connection that occurred during stage S206 in method 200 of FIG. 2. During stage S404, the processor 122 in the telematics unit 120 receives the initiating position fix responsive to the request for a position fix from a GPS unit that occurred during stage S402. During stage S406, the processor 122 stores the initiating position fix with the initiating time and the initiating date in the in-vehicle memory 128 of the telematics unit 120. The initiating time and the initiating date were stored in the in-vehicle memory 128 of the telematics unit 120 during stage S302 as described above.

During stage S408, the telematics unit 120 sends the initiating position fix, the initiating time and the initiating date to the call center 170 via a wireless connection.

In one embodiment, the call center 170 requests the initiating position fix, the initiating time and the initiating date from the telematics unit 120 based on a request by a user for the initiating position fix of the MVCU 100 for a specific short-range wireless connection. A user may request the initiating position fix of the MVCU 100 to dispute a roaming charge from the wireless carrier provider.

In another embodiment, telematics unit 120 sends the initiating time and the initiating date from the in-vehicle memory 128 responsive to triggering a vehicle data upload from the telematics unit 120 to the call center 170, as described with respect to stage S214. In one embodiment, the trigger is the passage of time since last generating a usage bill, a specific date associated with generating a usage bill, or a certain number of ignition cycles.

The wireless connection can be established as a wireless short messaging service (SMS) connection. Alternatively, the wireless connection can be established over the one or more wireless carrier systems 140, one or more communication networks 142 and one or more land networks 144 which do not include the short messaging service network. In one embodiment, the wireless connection is the same wireless connection used during stage S214 to send the tracked total usage time to the call center 170.

During stage S410, the call center 170 stores the initiating position fix, the initiating time and the initiating date in one or more communication services databases 176 at the call center 170. In one embodiment, the initiating position fix, the initiating time and the initiating date are stored for a limited time and then deleted. The limited time may be three months.

While the embodiments, of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of tracking short-range wireless communication in a vehicle, the method comprising:
   detecting a wireless communication signal from a portable wireless communication device at a telematics unit in the vehicle, the portable wireless communication device being selected from a personal digital assistant or a handset;
   initiating tracking of a short-range wireless connection between the portable wireless communication device and the telematics unit responsive to detecting the wireless communication signal;
   tracking, via the telematics unit, a total usage time of the short-range wireless connection between the telematics unit and the portable wireless communication device;
   triggering a vehicle upload request in response to at least one trigger;
   initiating, via the telematics unit, a wireless connection between the telematics unit and a call center and sending the tracked total usage time from the telematics unit to the call center via the wireless connection, the initiating and the sending being responsive to the triggering of the vehicle upload request; and
   generating a usage bill at the call center based on the total usage time.

2. The method of claim 1, wherein the detecting comprises:
   calibrating the portable wireless communication device with the telematics unit.

3. The method of claim 1, wherein tracking the total usage time comprises:
   storing an initiating time and an initiating date associated with initiating tracking of the short-range wireless connection;
   receiving a wireless end-communication signal from the portable wireless communication device at the telematics unit;
   storing a terminating time and a terminating date responsive to receiving the wireless end-communication signal;
   determining an event usage time based on the initiating time, the initiating date, the terminating time and terminating date; and
   adding the event usage time to the total usage time to update the total usage time responsive to determining the event usage time.

4. The method of claim 1, further comprising:
   requesting a position fix from a GPS unit in the telematics unit responsive to the initiating the short-range wireless connection;
   receiving an initiating position fix responsive to requesting a GPS position from a GPS unit; and
   storing the initiating position fix with an initiating time and an initiating date in the telematics unit.

5. The method of claim 4, further comprising:
   sending the initiating position fix, the initiating time and the initiating date to the call center; and
   store the initiating position fix, the initiating time and the initiating date at the call center.

6. The method of claim 1, wherein tracking the total usage time comprises:

storing the total usage time in the telematics unit; and resetting the total usage time to zero responsive to sending the tracked total usage time.

7. The method of claim 1, wherein the short-range wireless connection is established within a distance of 10 meters between the portable wireless communication device and the telematics unit.

8. A system for tracking short-range wireless communication in a vehicle, the system comprising:

means for detecting a wireless communication signal from the portable wireless communication device at a telematics unit in the vehicle, the portable wireless communication device being selected from a personal digital assistant or a handset;

means for initiating tracking of a short-range wireless connection between the Portable wireless communication device and the telematics unit responsive to detecting the wireless communication signal;

means for tracking, via the telematics unit, a total usage time of the short-range wireless connection between the telematics unit and the portable wireless communication device;

means for triggering a vehicle upload request in response to at least one trigger;

means for initiating, via the telematics unit, a wireless connection between the telematics unit and a call center and sending the tracked total usage time from the telematics unit to the call center via the wireless connection, the initiating and the sending being responsive to the means for triggering the vehicle upload request; and means for generating a usage bill at the call center based on the total usage time.

9. The system of claim 8, further comprising:

means for requesting a position fix from a GPS unit in the telematics unit responsive to initiating the short-range wireless connection;

means for receiving an initiating position fix responsive to requesting a position fix from a GPS unit; and means for storing the initiating position fix with an initiating time and an initiating date in the telematics unit.

10. The system of claim 9, further comprising:

means for sending the initiating position fix, the initiating time and the initiating date to the call center; and means for saving the initiating position fix, the initiating time, the initiating date, the terminating time and terminating date at the call center.

11. A computer readable medium storing a computer program comprising:

computer readable code for detecting a wireless communication signal from the portable wireless communication device at a telematics unit, the portable wireless communication device being selected from a personal digital assistant or a handset:

computer readable code for initiating tracking of a short-range wireless connection between the portable wireless communication device and the telematics unit responsive to detecting the wireless communication signal;

computer readable code for tracking, via the telematics unit, a total usage time of the short-range wireless connection between the telematics unit and the portable wireless communication device;

computer readable code for triggering a vehicle upload request in response to at least one trigger;

computer readable code for initiating, via the telematics unit, a wireless connection between the telematics unit and a call center and sending the tracked total usage time from the telematics unit to the call center via the wireless connection, the initiating and the sending being responsive to the triggering of the vehicle upload request; and computer readable code for generating a usage bill at the call center based on the total usage time.

12. The medium of claim 11, wherein computer readable code for tracking the total usage time comprises:

computer readable code for storing an initiating time and an initiating date associated with initiating tracking of the short-range wireless connection;

computer readable code for receiving a wireless end-communication signal from the portable wireless communication device at the telematics unit;

computer readable code for storing a terminating time and a terminating date responsive to receiving the wireless end-communication signal;

computer readable code for determining an event usage time based on the initiating time, the initiating date, the terminating time and terminating date; and computer readable code for adding the event usage time to the total usage time to update the total usage time responsive to determining the event usage time.

13. The medium of claim 11, further comprising:

computer readable code for requesting a position fix from a GPS unit in the telematics unit responsive to initiating the short-range wireless connection;

computer readable code for receiving an initiating position fix responsive to requesting a position fix from a GPS unit; and computer readable code for storing the initiating position fix with the initiating time and the initiating date in the telematics unit.

14. The medium of claim 13, further comprising:

computer readable code for sending the initiating position fix, the initiating time and the initiating date to the call center; and computer readable code for saving the initiating position fix, the initiating time, the initiating date, the terminating time and terminating date at the call center.

15. The method of claim 1 wherein prior to sending the tracked total usage time from the telematics unit to the call center via the wireless connection, the method further comprises accessing, via the portable wireless communication device, services supported by the telematics unit.

16. The method of claim 15 wherein the usage bill details the total usage time of the portable wireless communication device to utilize the services supported by the telematics unit.

17. The method as defined in claim 1 wherein the at least one trigger is selected from traveling a certain distance, a certain number of ignition cycles, a predetermined GPS-determined location, a setting of a diagnostic trouble code (DTC), passage of time, and combinations thereof.

* * * * *